Oct. 2, 1928.
M. C. OVERMAN
TIRE
Filed May 6, 1922
1,685,955
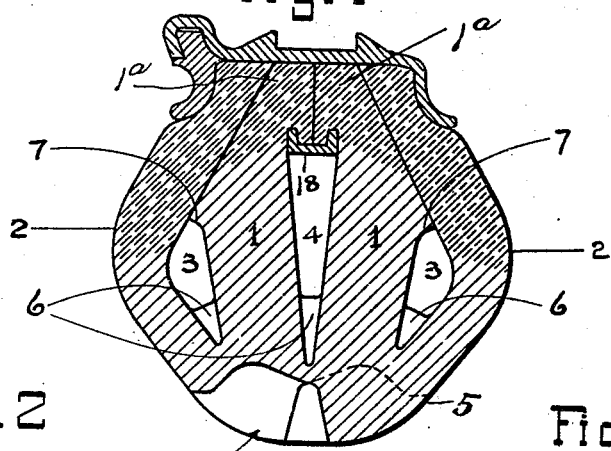
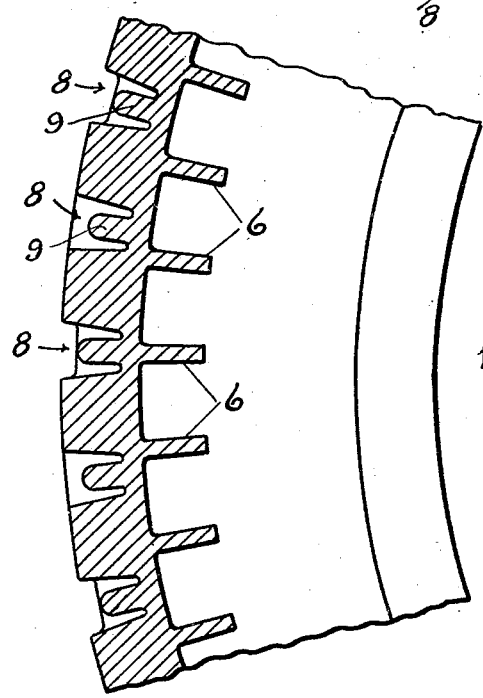
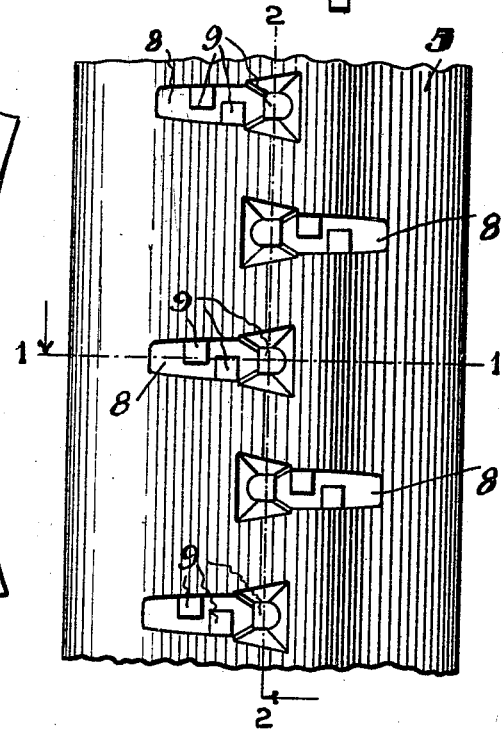
Inventor
Max Cyrus Overman
By his Attorney Patented Oct. 2, 1928.

1,685,955

UNITED STATES PATENT OFFICE.

MAX CYRUS OVERMAN, OF NEW YORK, N. Y., ASSIGNOR TO OVERMAN CUSHION TIRE COMPANY INC., A CORPORATION OF NEW YORK.

TIRE.

Application filed May 6, 1922. Serial No. 559,006.

My present invention relates to improvements in tires including the tires of my co-pending applications Serial Nos. 500,367 and 500,368 filed September 13, 1921, subsequently patented as United States Patents Nos. 1,618,128 and 1,618,129, dated February 15, 1927, whereby I increase the lateral stability of the tire by providing certain internal webs; also by the use of bracing extensions acting between the load-supporting and the laterally stabilizing members of the tire, but which extensions are themselves outside of the direct line of action of the load-sustaining forces; also by an improved conformation of the outer elbow-shaped members of the tire.

These improvements are applicable to tires including tires of the above general type but are especially applicable and useful in connection with a further improvement which I have made on this type of tire consisting in decreasing the width of the tread to decrease the tractive resistance of the tire on the roadway. Since this tends to impair the lateral stability of the tire, my aforesaid first named improvements are peculiarly applicable.

These and other features and advantages of my present improvements will appear from an understanding of the following description read in connection with the drawings which purport to show only the preferred embodiment of said improvements, although other embodiments are possible within the scope of my invention.

In the drawings, Fig. 1 is a cross-sectional view through my improved tire mounted on a well known form of tire rim; Fig. 2 is a longitudinal mid-sectional view of same; and Fig. 3 is an underneath plan view looking upwardly at the tread of said tire, Fig. 1 being a cross-sectional view on the line 1—1 in said Fig. 3 looking in the direction of the arrow, and Fig. 2 being a vertical longitudinal section partly in elevation on the line 2—2 in Fig. 3 looking in the direction of the arrow.

The expressions of direction such as "upper" and "lower" in the description and claims refer to a section of the tire in ground contact as shown in Fig. 1. The expression "elbow-shaped" definitive of the outer members; and "ends" definitive of the upper and lower portions of the inner and outer members; and like expressions, of course refer to said members when looked at or considered in tranverse section as in Fig. 1.

In the illustrated tire within my invention, 1—1 are upright load-supporting and shock-absorbing inner members and 2—2 are outer members serving to laterally stabilize or brace the inner members when the tire is in action. These members 1 and 2 are relatively closely adjacent and separated by proper spaces, two of which 3—3 are similar in cross-section and a third space being designated 4.

The lower ends of all these members are integrally united by a tread portion 5 having normally a relatively narrow ground contact limited substantially to the part thereof directly under the load-supporting members 1—1. The elbow-shaped laterally stabilizing or bracing outer members 2—2 have little or no ground contact when on a hard surface. The tractive resistance of the tire on the roadway is thus decreased, which is advantageous, but this tends to impair the lateral stability of the tire.

To promote lateral stability, I provide a series of spaced cross-webs 6 integrally uniting the inner and outer members 1 and 2 across the spaces 3 and 4 between said members. These webs may be formed at the time the tire is molded and do their work by tying together the important working members 1 and 2 of the tire.

Also, to promote lateral stability, I provide lateral extensions 7—7 which may project from the inner members 1—1 into contact with the sides of the outer members 2—2 as shown in the tire of the drawings.

These bracing extensions are located in the upper part of the spaces 3—3 outside of the direct line of action of the load-sustaining forces, whereby they are subjected as little as possible to the vertical and lateral compressions and expansions to which other parts of the tire are subjected when in action. In other words, their bracing and supporting effect is not interfered with when the tire is in action except to a minimum extent, and they have also minimum rubbing or sliding action against the surface of the members they support.

These bracing extensions 7—7 advantageously extend the mutual bracing and supporting actions of the upper portions of the inner and outer members 1 and 2, which when on the rim are in side by side contact with their free ends contained in the flange space of the rim as shown in Fig. 1.

The clamping ring 18 as usual clamps the portions 1ª of the inner members to the rim; and the upper portions of said inner members are adapted in turn to clamp the corresponding portions of the outer members against the rim and flanges.

The upper portions of both the outer and inner members that are in side by side contact are of a firmer and less yielding compound, as indicated in the drawings by the closer shade lines, than the other parts of the tire. This causes lessened movement and working of said parts on one another when the tire is in action and consequently reduces attrition and wear at the contacting surfaces of said parts. This is, of course, desirable, but reducing the height of fully alive rubber in the members 1—1 decreases the shock-absorbing ability of the tire to that extent. For this reason I prefer to keep the rubber in the members 1—1 fully live well up to the upper ends of said members and to depend upon the bracing extensions 7—7 for their effective and advantageous action as heretofore explained.

For the same purpose of improving the laterally stabilizing function of the outer members 2—2 I have constructed them so that their elbows shall be below the center line of the height of the tire, thereby causing their lower limbs to bear in towards the inner members more horizontally than they otherwise would do, thereby increasing their effectiveness as lateral bracing members.

The tread portion 5 of the tire comprises a circumferential series of transverse grooves or recesses 8 containing the pebble ejectors 9, said recesses being open at the bottom and sides of said tread portion and extending transversely from said sides to and beyond the center of the tread, the adjacent recesses extending in overlapping fashion from opposite sides of said tread portion as best shown in Fig. 3.

The tendency of the tread recesses 8 to weaken the tread portion of the tire and cause it to split into lateral parts along the median line 2—2 (Fig. 3) of the tread is resisted and counteracted by the heretofore described cross webs 6.

Some of the foregoing improvements may be used without others. Also changes and modifications may be made in the practical embodiments of my present improvements which will, nevertheless, still be within the spirit of the foregoing description and within the meaning and spirit of the annexed claims and which as such are accordingly intended to be covered thereby.

What I claim is:

1. In a tire, the combination of spaced inner and outer members united by a tread portion, said outer members being elbow-shaped in cross-section with the elbows directed laterally outwardly and with their limbs converging toward the tread and the base of the tire respectively; and a series of spaced cross-webs uniting said inner and outer members at the spaces between said members.

2. In a tire, the combination of spaced inner and outer members, the former being upright and load-supporting and the latter being laterally bracing members, a tread portion uniting one set of ends of said members, and a series of spaced cross-webs integrally uniting the inner to the outer members at the spaces between said members.

3. In a tire, the combination of spaced inner and outer members, the former being upright and load-supporting and the latter being laterally bracing members, a tread portion uniting one set of ends of said members, and a series of spaced cross-webs integrally uniting the inner to the outer members and also uniting the inner members to each other at the spaces between said members.

4. In a tire, the combination of spaced inner and outer members, the former being upright and load-supporting, the latter being laterally bracing members, a tread portion uniting one set of ends of said members and having normally a relatively narrow ground contact limited substantially to the part thereof directly under said inner members, and a series of spaced cross-webs integrally uniting said inner and outer members across the spaces between said members.

5. In a tire, the combination of inner and outer members, a tread portion uniting one set of ends of said members, the opposite set of ends of said members being adapted to be secured to a rim in side by side contact, said inner and outer members being spaced apart intermediate their ends, the inner being primarily load-supporting and the outer being laterally-stabilizing, elbow-shaped members containing the inner between them with their elbows at the sides of the tire and with their limbs converging toward the tread and toward the base of the tire respectively, the inner of said members having lateral extensions in the upper part of the spaces between said inner and outer members to laterally brace the outer members, which extensions are located outside of the direct line of action of the load-supporting forces and project into side contact with the lower portion of the basal limbs of the outer members.

6. In a tire, the combination of inner and outer members, a tread portion uniting one set of ends of said members, the opposite set of ends of said members being adapted to be secured to a rim in side by side contact, said inner and outer members being spaced apart intermediate their ends, the inner being primarily load-supporting and the outer being laterally-stabilizing, elbow-shaped members containing the inner between them with their elbows at the sides of the tire and with their limbs converging toward the tread and toward the base of the tire respectively, said inner and outer members in the upper part of the spaces between them and at the lower portion of the basal limbs of the outer members having lateral extensions from the one projecting into laterally bracing contact with the other so that said extensions are located outside of the direct line of action of the load-sustaining forces.

7. In a tire, the combination of inner and outer members, a tread portion uniting one set of ends of said members, the opposite set of ends of said members being adapted to be secured to a rim in side by side contact, said inner and outer members being spaced apart intermediate their ends, the inner being load-supporting and the outer being laterally-stabilizing, elbow-shaped members containing the inner between them with their elbows at the sides of the tire and with their limbs converging toward the tread and toward the base of the tire respectively, said inner and outer members in the upper part of the spaces between them having lateral extensions from the one projecting into side contact with the other so that said extensions are located outside of the direct line of action of the load-sustaining forces, and a series of spaced cross-webs integrally uniting said inner and outer members across the internal spaces between said members.

8. In a tire, the combination of inner and outer members, a tread portion uniting the lower ends of said members, their upper ends being adapted to be secured to a rim in side by side contact and being firmer and less yielding than other parts of the tire so that there will be reduced movement of said upper ends on one another at their contacting faces when the tire is in action, said inner and outer members being spaced apart intermediate their ends, the inner being load-supporting and the outer being laterally-stabilizing, elbow-shaped members containing the inner between them, with the elbows at the sides of the tire and with their limbs converging toward the tread and toward the base of the tire respectively, said inner and outer members in the upper part of the spaces between them having lateral extensions from the one projecting into side contact with the other so that said extensions are located outside of the direct line of action of the load-sustaining forces.

9. In a tire, the combination of spaced inner and outer members, a tread portion uniting the lower ends of said members, the upper portions of said members being adapted to be secured to a rim in side by side contact, said inner and outer members having bracing extensions from the one projecting laterally into side contact with the other to laterally brace the same in the middle zone of the tire.

10. In a tire, the combination of upright load-sustaining space-separated members which are substantially straight, radially in relation to the center of rotation of the tire throughout their space-bordering portions and which are convergent toward and integrally united in the tread portion of the tire, with means for increasing the lateral stability of the said load-sustaining members comprising circumferentially spaced internal cross webs integrally united with said members across the space separating them.

11. In a tire, the combination of upright load-sustaining space-separated members which are substantially straight, radially in relation to the center of rotation of the tire throughout their space-bordering portions and which are convergent toward and integrally united in the tread portion of the tire, with means for increasing the lateral stability of the said load-sustaining members comprising circumferentially spaced internal cross webs integrally united with said members across the space separating them adjacent to their union with the tread portion of the tire.

12. In a tire comprising upright load-sustaining space-separated members convergent toward and intergrally united in the tread portion of the tire, said tread portion having a plurality of circumferentially spaced transversely extending recesses in its tread under the aforesaid load-sustaining space-separated members, the combination therewith of circumferentially spaced internal cross webs integrally uniting the said members across the space separating them whereby the lateral stability of said load-sustaining members is increased and the liability of said tread portion to split into lateral parts is decreased.

13. In a tire, the combination of upright load-supporting space-separated members convergent toward and integrally united in a recess-weakened tread portion, with circumferentially-spaced internal cross-webs integrally uniting the said members across the space separating them and reinforcing the recess-weakened tread portion against splitting into lateral parts.

In testimony whereof, I have signed my name to this specification, this 5th day of May, 1922.

MAX CYRUS OVERMAN.